US00RE48700E

(19) United States
(12) Reissued Patent
Dhupelia et al.

(10) Patent Number: US RE48,700 E
(45) Date of Reissued Patent: Aug. 24, 2021

(54) METHOD FOR LADDER RANKING IN A GAME

(71) Applicant: SONY INTERACTIVE ENTERTAINMENT AMERICA LLC, San Mateo, CA (US)

(72) Inventors: Shekhar V. Dhupelia, San Diego, CA (US); Glen Van Datta, San Diego, CA (US); Brian Fernandes, San Diego, CA (US); Eiko Erika Kato, San Diego, CA (US); William McCarroll, San Diego, CA (US)

(73) Assignee: SONY INTERACTIVE ENTERTAINMENT AMERICA LLC, San Mateo, CA (US)

(21) Appl. No.: 15/688,592

(22) Filed: Aug. 28, 2017

Related U.S. Patent Documents

Reissue of:
(64) Patent No.: 7,962,549
Issued: Jun. 14, 2011
Appl. No.: 12/839,311
Filed: Jul. 19, 2010

U.S. Applications:
(60) Continuation of application No. 13/918,809, filed on Jun. 14, 2013, which is an application for the reissue
(Continued)

(51) Int. Cl.
*G06F 15/16* (2006.01)
*A63F 13/352* (2014.01)
(Continued)

(52) U.S. Cl.
CPC ..... *A63F 13/352* (2014.09); *A63F 13/358* (2014.09); *A63F 13/71* (2014.09);
(Continued)

(58) Field of Classification Search
CPC ..... A63F 13/795; A63F 13/87
See application file for complete search history.

(56) References Cited

U.S. PATENT DOCUMENTS

| | | | |
|---|---|---|---|
| 5,630,757 | A | 5/1997 | Gagin et al. |
| 5,634,129 | A | 5/1997 | Dickinson |
| 5,682,139 | A | 10/1997 | Pradeep |
| 5,704,032 | A | 11/1997 | Badovinatz et al. |
| 5,823,879 | A | 10/1998 | Goldberg |

(Continued)

FOREIGN PATENT DOCUMENTS

| | | | |
|---|---|---|---|
| CN | 104069637 | A | 10/2014 |
| EP | 1125617 | | 8/2001 |

(Continued)

OTHER PUBLICATIONS

U.S. Appl. No. 15/702,580 Office Action dated Jan. 24, 2019.
(Continued)

*Primary Examiner* — Cameron Saadat
(74) *Attorney, Agent, or Firm* — Polsinelli LLP

(57) ABSTRACT

Methods for creating an interactive gaming environment are provided. In various embodiments, methods of the present invention may include initializing an interactive game application at a game server which is then characterized as having an active status, notifying a lobby server concerning the active status of the game server, registering the application with a universe management server via the lobby server, and allowing users to join the interactive gaming environment. The users joining the interactive gaming environment may be identified by a server key obtained from the game server.

41 Claims, 7 Drawing Sheets

Related U.S. Application Data of Pat. No. 7,962,549, which is a continuation of application No. 12/218,581, filed on Jul. 15, 2008, now Pat. No. 7,822,809, which is a division of application No. 10/359,359, filed on Feb. 4, 2003, now Pat. No. 7,711,847.

(60) Provisional application No. 60/376,115, filed on Apr. 26, 2002.

(51) Int. Cl.

| | |
|---|---|
| ***G06Q 40/00*** | (2012.01) |
| ***A63F 13/358*** | (2014.01) |
| ***A63F 13/71*** | (2014.01) |
| ***G06Q 10/02*** | (2012.01) |
| ***G06Q 20/10*** | (2012.01) |
| ***H04L 29/08*** | (2006.01) |
| ***H04L 29/06*** | (2006.01) |
| *A63F 13/335* | (2014.01) |

(52) U.S. Cl.

CPC ..... *G06Q 10/025* (2013.01); *G06Q 20/108* (2013.01); *G06Q 40/123* (2013.12); *H04L 67/1002* (2013.01); *H04L 67/1012* (2013.01); *H04L 67/1014* (2013.01); *H04L 67/38* (2013.01); *A63F 13/335* (2014.09); *A63F 2300/401* (2013.01); *A63F 2300/407* (2013.01); *A63F 2300/50* (2013.01); *A63F 2300/513* (2013.01); *A63F 2300/532* (2013.01); *A63F 2300/534* (2013.01); *A63F 2300/5546* (2013.01); *Y10S 707/99931* (2013.01); *Y10S 707/99936* (2013.01)

(56) References Cited

U.S. PATENT DOCUMENTS

| | | | | |
|---|---|---|---|---|
| 5,826,085 | A | 10/1998 | Bennet | |
| 5,838,909 | A | 11/1998 | Roy et al. | |
| 5,841,980 | A | 11/1998 | Waters | |
| 5,862,339 | A | 1/1999 | Bonnaure et al. | |
| 5,893,106 | A | 4/1999 | Brobst et al. | |
| 5,941,947 | A | 8/1999 | Brown | |
| 5,956,485 | A | 9/1999 | Perlman | |
| 5,984,787 | A * | 11/1999 | Redpath | 463/42 |
| 5,987,376 | A | 11/1999 | Olson et al. | |
| 6,038,599 | A | 3/2000 | Black et al. | |
| 6,041,312 | A | 3/2000 | Bickerton et al. | |
| 6,050,898 | A | 4/2000 | Vange | |
| 6,098,091 | A | 8/2000 | Kisor | |
| 6,106,569 | A | 8/2000 | Bohrer | |
| 6,108,569 | A | 8/2000 | Shen | |
| 6,142,472 | A | 11/2000 | Kliebisch | |
| 6,151,632 | A | 11/2000 | Chaddha et al. | |
| 6,152,824 | A | 11/2000 | Rothschild et al. | |
| 6,154,782 | A | 11/2000 | Kawaguchi et al. | |
| 6,203,433 | B1 | 3/2001 | Kume | |
| 6,219,045 | B1 | 4/2001 | Leahy et al. | |
| 6,247,017 | B1 | 6/2001 | Martin | |
| 6,311,209 | B1 | 10/2001 | Olson et al. | |
| 6,345,297 | B1 | 2/2002 | Grimm | |
| 6,352,479 | B1 | 3/2002 | Sparks | |
| 6,363,416 | B1 | 3/2002 | Naeimi | |
| 6,446,113 | B1 | 9/2002 | Ozzie et al. | |
| 6,470,022 | B1 | 10/2002 | Rochberger | |
| 6,487,583 | B1 | 11/2002 | Harvey | |
| 6,487,678 | B1 | 11/2002 | Briskey et al. | |
| 6,519,629 | B2 | 2/2003 | Harvey | |
| 6,530,840 | B1 | 3/2003 | Cuomo | |
| 6,539,494 | B1 | 3/2003 | Abramson et al. | |
| 6,549,946 | B1 | 4/2003 | Fisher | |
| 6,560,636 | B2 | 5/2003 | Cohen et al. | |
| 6,561,811 | B2 | 5/2003 | Rapoza et al. | |
| 6,577,628 | B1 | 6/2003 | Hejza | |
| 6,587,874 | B1 | 7/2003 | Golla | |
| 6,607,444 | B2 | 8/2003 | Takahashi et al. | |
| 6,631,412 | B1 | 10/2003 | Glasser et al. | |
| 6,654,831 | B1 | 11/2003 | Otterness et al. | |
| 6,676,521 | B1 | 1/2004 | La Mura et al. | |
| 6,704,885 | B1 | 3/2004 | Salas-Meza et al. | |
| 6,748,420 | B1 | 6/2004 | Quatrano et al. | |
| 6,755,743 | B1 * | 6/2004 | Yamashita | A63F 13/005 463/42 |
| 6,761,636 | B2 | 7/2004 | Chung et al. | |
| 6,763,371 | B1 | 7/2004 | Jandel | |
| 6,766,364 | B2 | 7/2004 | Moyer et al. | |
| 6,769,990 | B2 | 8/2004 | Cohen | |
| 6,799,255 | B1 | 9/2004 | Blumenau | |
| 6,839,435 | B1 | 1/2005 | Lijima et al. | |
| 6,844,893 | B1 | 1/2005 | Miller et al. | |
| 6,931,446 | B1 | 8/2005 | Cox et al. | |
| 7,003,550 | B1 | 2/2006 | Cleasby et al. | |
| 7,016,942 | B1 | 3/2006 | Odom | |
| 7,018,295 | B2 | 3/2006 | Sakaguchi et al. | |
| 7,025,675 | B2 | 4/2006 | Fogel | |
| 7,035,919 | B1 | 4/2006 | Lee et al. | |
| 7,056,217 | B1 * | 6/2006 | Pelkey | A63F 13/12 463/25 |
| 7,089,301 | B1 | 8/2006 | Labio et al. | |
| 7,107,312 | B2 | 9/2006 | Hackbarth et al. | |
| 7,155,515 | B1 | 12/2006 | Brown et al. | |
| 7,165,107 | B2 | 1/2007 | Pouyoul et al. | |
| 7,177,950 | B2 | 2/2007 | Narayan et al. | |
| 7,188,145 | B2 | 3/2007 | Lowery et al. | |
| 7,203,755 | B2 | 4/2007 | Zhu et al. | |
| 7,290,264 | B1 | 10/2007 | Powers et al. | |
| 7,366,185 | B2 | 4/2008 | Bush | |
| 7,454,458 | B2 | 11/2008 | Islam et al. | |
| 7,523,163 | B2 | 4/2009 | Zhu et al. | |
| 7,539,216 | B2 | 5/2009 | Johns et al. | |
| 7,587,465 | B1 | 9/2009 | Muchow | |
| 7,613,800 | B2 | 11/2009 | Dhupelia | |
| 7,640,298 | B2 | 12/2009 | Berg | |
| 7,680,908 | B2 | 3/2010 | Gates, III et al. | |
| 7,711,847 | B2 | 5/2010 | Dhupelia | |
| 7,720,908 | B1 | 5/2010 | Newson et al. | |
| 7,730,206 | B2 | 6/2010 | Newson et al. | |
| 7,792,902 | B2 | 9/2010 | Chatani | |
| 7,822,809 | B2 | 10/2010 | Dhupelia | |
| 7,831,666 | B2 | 11/2010 | Chatani et al. | |
| 7,877,509 | B2 | 1/2011 | Dhupelia | |
| 7,899,017 | B2 | 3/2011 | Yu et al. | |
| 7,908,393 | B2 | 3/2011 | Marr et al. | |
| 7,930,345 | B2 | 4/2011 | Dhupelia | |
| 7,962,549 | B2 | 6/2011 | Dhupelia | |
| 8,032,619 | B2 | 10/2011 | Kato et al. | |
| 8,050,272 | B2 | 11/2011 | Chaturvedi et al. | |
| 8,051,180 | B2 | 11/2011 | Mazzaferri et al. | |
| 8,131,802 | B2 | 3/2012 | Jacob | |
| 8,214,489 | B2 | 7/2012 | Ballette et al. | |
| 8,335,813 | B2 | 12/2012 | Sun et al. | |
| 8,402,124 | B1 | 3/2013 | Barillaud et al. | |
| 8,549,150 | B1 | 10/2013 | Roseman et al. | |
| 8,554,842 | B2 | 10/2013 | Maehiro | |
| 8,560,707 | B2 | 10/2013 | Jacob | |
| 8,719,143 | B2 | 5/2014 | Meijer et al. | |
| 8,719,375 | B2 | 5/2014 | Hildreth et al. | |
| 8,725,874 | B2 | 5/2014 | Keohane et al. | |
| 8,856,233 | B2 | 10/2014 | Lacapra et al. | |
| 8,965,978 | B2 | 2/2015 | Chandranmenon et al. | |
| 8,972,548 | B2 | 3/2015 | Jacob | |
| 8,990,305 | B2 | 3/2015 | Barkley et al. | |
| 9,032,248 | B1 | 5/2015 | Petty et al. | |
| 9,318,003 | B2 | 4/2016 | Nilsson et al. | |
| 9,369,540 | B2 | 6/2016 | Lowery et al. | |
| 9,516,068 | B2 | 12/2016 | Jacob | |
| 9,729,621 | B2 | 8/2017 | Jacob | |
| 9,762,631 | B2 | 9/2017 | Chatani | |
| 10,063,631 | B2 | 8/2018 | Jacob | |
| 10,547,670 | B2 | 1/2020 | Jacob | |
| 10,659,500 | B2 | 5/2020 | Chatani | |
| 2001/0009868 | A1 | 7/2001 | Sakaguchi et al. | |

(56) References Cited

U.S. PATENT DOCUMENTS

2001/0024974 A1 9/2001 Cohen
2001/0037466 A1 11/2001 Fukutake et al.
2001/0044339 A1* 11/2001 Cordero ..... A63F 13/34 463/42
2002/0023117 A1 2/2002 Bernardin et al.
2002/0035604 A1 3/2002 Cohen et al.
2002/0042830 A1 4/2002 Bose et al.
2002/0049086 A1 4/2002 Otsu
2002/0062348 A1 5/2002 Maehiro
2002/0075844 A1 6/2002 Hagen
2002/0075940 A1 6/2002 Haartsen
2002/0082077 A1 6/2002 Johnson
2002/0082086 A1* 6/2002 Scallie ..... A63F 13/12 463/42
2002/0086732 A1 7/2002 Kirmse et al.
2002/0107934 A1 8/2002 Lowery et al.
2002/0107935 A1 8/2002 Lowery et al.
2002/0115488 A1 8/2002 Berry
2002/0133707 A1 9/2002 Newcombe
2002/0142842 A1* 10/2002 Easley ..... A63F 13/12 463/42
2002/0156917 A1 10/2002 Nye
2002/0169889 A1 11/2002 C
2002/0178260 A1 11/2002 Chang
2002/0184070 A1 12/2002 Chen et al.
2003/0018719 A1 1/2003 Ruths
2003/0073494 A1 4/2003 Kalpakian et al.
2003/0093669 A1 5/2003 Morals et al.
2003/0126245 A1 7/2003 Feltin et al.
2003/0167343 A1 9/2003 Furuno
2003/0190960 A1 10/2003 Jokipii
2003/0204566 A1 10/2003 Dhupelia
2003/0204593 A1 10/2003 Brown et al.
2003/0214943 A1 11/2003 Engstrom et al.
2003/0216181 A1 11/2003 Daniell et al.
2003/0217135 A1 11/2003 Chatani
2003/0217158 A1 11/2003 van Datta
2003/0233537 A1 12/2003 Wohlgemuth et al.
2004/0001476 A1 1/2004 Islam et al.
2004/0002384 A1 1/2004 Multerer et al.
2004/0024879 A1 2/2004 Dingman
2004/0030787 A1 2/2004 Jandel
2004/0031052 A1 2/2004 Wannamaker et al.
2004/0053690 A1 3/2004 Fogel
2004/0059711 A1 3/2004 Jandel
2004/0117443 A1 6/2004 Barsness
2004/0139228 A1 7/2004 Takeda
2005/0038836 A1 2/2005 Wang
2005/0068894 A1 3/2005 Yu et al.
2005/0105526 A1 5/2005 Stiemerling
2005/0144521 A1 6/2005 Werner
2005/0181878 A1 8/2005 Danieli et al.
2005/0245317 A1 11/2005 Arthur et al.
2005/0251577 A1 11/2005 Guo
2005/0259637 A1 11/2005 Chu
2005/0262411 A1 11/2005 Vertes
2006/0015560 A1 1/2006 MacAuley et al.
2006/0047836 A1 3/2006 Rao et al.
2006/0075127 A1 4/2006 Juncker
2006/0085792 A1 4/2006 Traut
2006/0092942 A1 5/2006 Newson et al.
2006/0100020 A1 5/2006 Kasai
2006/0142085 A1 6/2006 Kim
2006/0168107 A1 6/2006 Balan et al.
2006/0164974 A1 7/2006 Ramalho et al.
2006/0190540 A1 8/2006 Chatani
2006/0200551 A1 9/2006 Bali et al.
2006/0218274 A1 9/2006 Labio et al.
2006/0218275 A1 9/2006 Labio et al.
2006/0221856 A1 10/2006 Quiroz
2006/0247011 A1 11/2006 Gagner
2006/0248144 A1 11/2006 Zhu et al.
2006/0253595 A1 11/2006 van Datta
2006/0258463 A1 11/2006 Cugno et al.
2006/0288103 A1 12/2006 Gobara
2007/0058792 A1 3/2007 Chaudhari
2007/0061460 A1 3/2007 Khan
2007/0076729 A1 4/2007 Takeda
2007/0094325 A1 4/2007 Ih et al.
2007/0099702 A1 5/2007 Tupper
2007/0165629 A1 7/2007 Chaturvedi
2007/0174399 A1 7/2007 Ogle et al.
2007/0191109 A1 8/2007 Crowder
2007/0208748 A1 9/2007 Li
2007/0217436 A1 9/2007 Markley
2007/0233865 A1 10/2007 Garbow et al.
2007/0288598 A1 12/2007 Edeker et al.
2007/0291706 A1 12/2007 Miller et al.
2008/0049755 A1 2/2008 Gannon et al.
2008/0189365 A1 8/2008 Narayanaswami et al.
2008/0243953 A1 10/2008 Wu et al.
2008/0280686 A1 11/2008 Dhupelia et al.
2008/0291839 A1 11/2008 Hooper et al.
2009/0006545 A1 1/2009 Dhupelia
2009/0006604 A1 1/2009 Dhupelia
2009/0077245 A1 3/2009 Smelyansky
2009/0089363 A1 4/2009 Keohane et al.
2009/0094370 A1 4/2009 Jacob
2009/0113060 A1 4/2009 Jacob
2009/0138610 A1 5/2009 Gobara
2009/0157882 A1 6/2009 Kashyap
2009/0240821 A1 9/2009 Juncker
2009/0287828 A1 11/2009 Wei et al.
2010/0153496 A1 6/2010 Heinla
2010/0279767 A1 11/2010 Dhupelia
2010/0285872 A1 11/2010 Dhupelia
2010/0287239 A1 11/2010 Chatani
2012/0166651 A1 6/2012 Jacob
2013/0304931 A1 11/2013 Jacob
2014/0256449 A1 9/2014 Chatani et al.
2015/0180958 A1 6/2015 Jacob
2018/0013802 A1 1/2018 Chatani
2018/0013820 A1 1/2018 Jacob
2020/0329094 A1 10/2020 Jacob

FOREIGN PATENT DOCUMENTS

EP 1499987 1/2005
EP 2360874 8/2011
EP 2360875 8/2011
GB 2325543 A 11/1998
IN 269863 12/2015
JP 05-022346 1/1993
JP 63-32725 9/1998
JP 11-234326 8/1999
JP 2000-124939 4/2000
JP 2000-157724 6/2000
JP 2001-187273 7/2001
JP 2001-314657 11/2001
JP 2002-011251 1/2002
JP 2003-099337 4/2003
TW 201347493 11/2013
TW I491229 7/2015
WO WO 2000/05854 2/2000
WO WO 2000/10099 2/2000
WO WO 2000/68864 11/2000
WO WO 2001/63423 8/2001
WO WO 2001/82678 11/2001
WO WO 2002/35769 5/2002
WO WO 2003/091894 11/2003
WO WO 2003/100643 12/2003
WO WO 2004/063843 7/2004
WO WO 2005/088466 9/2005
WO WO 2006/023508 3/2006
WO WO 2009/045475 4/2009

OTHER PUBLICATIONS

U.S. Appl. No. 15/672,113 Office Action dated Mar. 8, 2018.
"Brief for Appellee," in re Masayuki Chatani et al., U.S. Court of Appeals for the Federal Circuit (2007-1150) (May 21, 2007).
"Brief of Appellants," in re Masayuki Chatani et al., U.S. Court of Appeals for the Federal Circui (2007-1150) (Mar. 23, 2007).

(56) References Cited

OTHER PUBLICATIONS

"In Re Masayuki Chatani and Glen Van Datta," United States Court of Appeals for the Federal Circuit, 2007-1150 (U.S. Appl. No. 11/211,128), Nov. 19, 2007.
"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.
"Reply Brief of Appellants," In re Masayuki Chatani et al., U.S. Court of Appeals for the Federal Circuit (2007-1150) (Jun. 4, 2007).
"Technical Issues of establishing any-to-any 2-way real-time communications over the internet," Apr. 24, 2005, URL http://web.archive.org/web/20050424081036/.
Aronson, Jesse. "Using Groupings for Networked Gaming," Gamasutra.com, Jun. 21, 2000.
Audet, F. Nat Behavioral Requirements for Unicast UDP, Behave Internet-Draft, Jul. 15, 2005.
Boulic, Ronan etl al. "Integration of Motion Control Techniques for Virtual Human and Avatar Real-Time Animation," Swiss Fedl Inst. Of Tech., Lausanne, Switzerland, Sep. 1997.
Chiueh, Tzi-cker, "Distributed Systems Support for Networked Games," Computer Science Department, State University of New York at Stony Brook, Stony Brook, NY, May 1997.
Cisco Systems Inc., "Network Flow Management: Resource Reservation for Multimedia Flows," Mar. 19, 1999.
Diot et al., "A Distributed Architecture for Multiplayer Interactive Applications on the Internet", Aug. 1999, Network, IEEE, vol. 13, Issue 4, Jul.-Aug. 1999, pp. 6-15.
ECC Report 50. "Technical Issues of Establishing Any-to-Any-2-Way Real-Time Communications over the Internet." Electronic Communications Committee (ECC). Gothenburg, Jul. 2004.
Festa and Borland, "Netscape alumni to launch P2P company", Aug. 2, 2001, (avaiable at http://news.cnet.com/news/0/1005-202-6766377.html).
Hagsand O: Interactive Multiuser Ves in the Dive System: IEEE Multimedia, IEEE Service Center, New York, NY, US vol. 3, No. 1, 21 Mar. 21, 1996, pp. 30-39, XP000582951 ISSN: 1070-986X.
Hanada, S. "The Design of Network Game and DirectPlay," Inside Windows, Softbank K.K., vol. 4, pp. 42-57, Apr. 1, 1998.
Rosenberg, J. Interactive Connectivity Establishment (ICE): A Methodology for Network Address Translator (NAT) Traversal for Multimedia Session Establishment Protocols, Mmusic Internet-Draft, Jul. 19, 2004.
Rosenberg, J. Interactive Connectivity Establishment (ICE): A Methodology for Network Address Translator (NAT) Traversal for Offer/Answer Protocols, Mmusic Internet—Draft, Jul. 17, 2005.
Rosenberg, J. Interactive Connectivity Establishment (ICE): A Methodology for Network Address Translator (NAT) Traversal for Off/Answer Protocols, Mmusic Internet—Draft, Jan. 16, 2007.
Rosenberg, J. "Simple Traversal of UDP Through Network Address Translators (NAT)," Behave Internet—Draft, Jul. 17, 2005.
Rosenberg, J. STUN—Simple Traversal of User Datagram Protocols (UDP) Throught Network Address Translators (NATs), Network Working Group, Mar. 2003.
Rosenberg, J. Traversal using Relay NAT (TURN), Midcom Internet—Draft, Oct. 20, 2003.
Takeda, Y. Symmetric NAT Traversal Using STUN, Internet Engineering Task Force, Jun. 2003.
PCT/US03/08682 International Search Report dated Oct. 14, 2003.
PCT/US03/12668 International Search Report dated Jul. 17, 2003.
PCT/US08/11415 Search Report and Written Opinion dated Dec. 5. 2008.
EP 037211413, European Search Report dated Jun. 30, 2005.
Chinese Application No. 03801033, Office Action dated Jun. 9, 2006.
Chinese Application No. 03801033, Office Action dated Jul. 5, 2011.
Chinese Application No. 03801033, Office Action dated Sep. 25, 2009.
Chinese Application No. 201410266012.9, Office Action dated Jul. 27, 2016.
European Application No. 03724201.3, Office Action dated Dec. 13, 2013.
European Application No. 03724201.3, Office Action dated Jul. 3, 2012.
Chinese Application No. 200810168739.8, Decision of Rejection dated Dec. 11, 2012.
Chinese Application No. 200810168739.8, Office Action dated May 11, 2012.
Chinese Application No. 200810168739.8, Office Action dated May 19, 2011.
Chinese Application No. 20088011547.1, Decision of Rejection dated Jul. 5, 2013.
Chinese Application No. 20088011547.1, Office Action dated Oct. 12, 2012.
Chinese Application No. 20088011547.1, Office Action dated Mar. 7, 2012.
Chinese Application No. 20088011547.1, Office Action dated Aug. 10, 2012.
EP 08014892.7 Office Action dated Jul. 20, 2011.
Taiwan Application No. 097138349, Office Action dated Mar. 26, 2014.
Taiwan Application No. 097138349, Office Action dated Feb. 8, 2013.
EP 08835745.4 Extended European Search Report dated Jul. 22, 2011.
EP 11004182.9 Extended European Search Report dated Jul. 14, 2011.
EP 11004181.1 Extended European Search Report dated Jul. 22, 2011.
U.S. Application No. 10/211,128 Final Office Action dated Feb. 2, 2004.
U.S. Appl. No. 10/211,128 Office Action dated Nov. 10, 2003.
U.S. Appl. No. 11/375,526 Office Action dated Apr. 8, 2008.
U.S. Appl. No. 11/375,526 Final Office Action dated Jul. 3, 2007.
U.S. Appl. No. 11/375,526 Final Office Action dated Mar. 2, 2007.
U.S. Appl. No. 11/375,526 Office Action dated Oct. 24, 2006.
U.S. Appl. No. 11/403,623 Office Action dated Jun. 25, 2009.
U.S. Appl. No. 11/403,623 Office Action dated Apr. 9, 2008.
U.S. Appl. No. 11/403,623 Final Office Action dated Jul. 3, 2007.
U.S. Appl. No. 11/403,623 Final Office Action dated Mar. 5, 2007.
U.S. Appl. No. 11/403,623 Office Action dated Oct. 24, 2006.
U.S. Appl. No. 12/840,977 Office Action dated Jul. 30, 2013.
U.S. Appl. No. 12/840,977 Final Office Action dated Jun. 18, 2012.
U.S. Appl. No. 12/840,977 Final Office Action dated Oct. 19, 2011.
U.S. Appl. No. 12/840,977 Office Action dated May 16, 2011.
U.S. Appl. No. 12/840,977 Final Office Action dated Dec. 3, 2010.
U.S. Appl. No. 14/283,959 Office Action dated Jan. 11, 2017.
U.S. Appl. No. 14/283,959 Final Office Action dated Jul. 19, 2016.
U.S. Appl. No. 14/283,959 Office Action dated Feb. 4, 2016.
U.S. Appl. No. 10/359,359 Final Office Action dated Nov. 27, 2009.
U.S. Appl. No. 10/359,359 Office Action dated Mar. 31, 2009.
U.S. Appl. No. 10/359,359 Office Action dated Aug. 27, 2007.
U.S. Appl. No. 10/359,359 Final Office Action dated Feb. 9, 2007.
U.S. Appl. No. 10/359,359 Office Action dated Aug. 8, 2006.
U.S. Appl. No. 12/839,306 Office Action dated Nov. 12, 2010.
U.S. Appl. No. 12/839,311 Office Action dated Nov. 12, 2010.
U.S. Appl. No. 12/218,581 Office Action dated Sep. 2, 2010.
U.S. Appl. No. 12/218,581 Office Action dated Feb. 1, 2010.
U.S. Appl. No. 12/218,581 Office Action dated Oct. 2, 2009.
U.S. Appl. No. 12/218,591 Office Action dated Feb. 25, 2009.
U.S. Appl. No. 13/918,809 Final Office Action dated May 10, 2017.
U.S. Appl. No. 13/918,809 Office Action dated Oct. 20, 2016.
U.S. Appl. No. 13/918,809 Final Office Action dated Nov. 18, 2015.
U.S. Appl. No. 13/918,809 Office Action dated Apr. 29, 2015.
U.S. Appl. No. 13/918,809 Office Action dated Jun. 10, 2014.
U.S. Appl. No. 12/049,954 Final Office Action dated Dec. 14, 2010.
U.S. Appl. No. 12/049,954 Office Action dated Jun. 24, 2010.
U.S. Appl. No. 12/235,438 Final Office Action dated Jan. 4, 2012.
U.S. Appl. No. 12/235,438 Office Action dated Aug. 8, 2011.
U.S. Appl. No. 12/235,438 Final Office Action dated Aug. 31, 2010.
U.S. Appl. No. 12/235,438 Office Action dated Apr. 15, 2010.

(56) References Cited

OTHER PUBLICATIONS

U.S. Appl. No. 13/412,361 Office Action dated Jun. 17, 2014.
U.S. Appl. No. 13/412,361 Final Office Action dated Nov. 28, 2012.
U.S. Appl. No. 13/412,361 Office Action dated Jul. 30, 2012.
U.S. Appl. No. 13/941,436 Final Office Action dated Oct. 7, 2015.
U.S. Appl. No. 13/941,436 Office Action dated Jun. 22, 2015.
U.S. Appl. No. 14/637,182 Office Action dated Sep. 9, 2016.
U.S. Appl. No. 15/702,580, filed Sep. 12, 2017, Masayuki Chatani, Managing Participants in an Online Session.
U.S. Appl. No. 13/918,809, filed Jun. 14, 2013, Shekar V. Dhupelia, Method for Ladder Ranking in a Game.
U.S. Appl. No. 15/672,113, filed Aug. 8, 2017, Mark L. Jacob, Systems and Methods for Seamless Host Migration.
U.S. Appl. No. 16/048,065, filed Jul. 27, 2018, Mark L. Jacob, Systems and Methods for Seamless Host Migration.
U.S. Appl. No. 13/918,809 Office Action dated Nov. 29, 2017.
U.S. Appl. No. 15/702,580 Final Office Action dated May 13, 2019.
U.S. Appl. No. 13/918,809 Office Action dated Jul. 12, 2019.
U.S. Appl. No. 16/048,065 Office Action dated Jun. 27, 2019.
U.S. Appl. No. 15/688,610, filed Aug. 28, 2017, Shekhar V. Dhupelia, Method for Ladder Ranking in a Game.
U.S. Appl. No. 15/688,656, filed Aug. 28, 2017, Shekhar V. Dhupelia, Method for Ladder Ranking in a Game.
U.S. Appl. No. 13/918,809 Office Action dated Apr. 3, 2020.
U.S. Appl. No. 15/688,610 Office Action dated Jan. 30, 2020.
PCT/US08/11415 International Preliminary Report on Patentability dated Apr. 7, 2010.
U.S. Appl. No. 15/688,610 Final Office Action dated Sep. 29, 2020.
U.S. Appl. No. 15/688,656 Final Office Action dated Oct. 14, 2020.
U.S. Appl. No. 16/773,589 Office Action dated Oct. 6, 2020.
U.S. Appl. No. 15/688,656 Office Action dated Apr. 27, 2021.
U.S. Appl. No. 16/773,589 Office Action dated May 4, 2021.
U.S. Appl. No. 15/702,580 Office Action dated Oct. 7, 2019.
U.S. Appl. No. 15/688,656 Office Action dated Apr. 20, 2020.
U.S. Appl. No. 13/918,809 Final Office Action dated Nov. 3, 2020.
U.S. Appl. No. 16/773,589, filed Jan. 27, 2020, Mark L. Jacob, Systems and Methods for Seamless Host Migration.
U.S. App. No. 16/878,437, filed May 19, 2020, Masayuki Chatani, Managing Participants in an Online Session.
Hanada, S. "The Design of Network Game and DirectPlay," Inside Windows, Softbank K.K., vol. 4, No. 4, pp. 42-57, Apr. 1, 1998.

* cited by examiner

METHOD FOR LADDER RANKING IN A GAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation and claims the priority benefit of U.S. patent application Ser. No. 12/218,581, filed Jul. 15, 2008, now U.S. Pat. No. 7,822,809 and entitled "Creating and Interactive Gaming Environment," which is a divisional and claims the priority benefit of U.S. patent application Ser. No. 10/359,359, filed Feb. 4, 2003, now U.S. Pat. No. 7,711,847 and entitled "Managing Users in a Multi-User Network Game Environment." U.S. patent application Ser. No. 10/359,359 claims the priority benefit of U.S. provisional patent application Ser. No. 60/376,115, filed Apr. 26, 2002 and entitled "Multi-User Application Program Interface." The disclosure of each of the aforementioned applications is incorporated by reference.] *More than one reissue application has been filed for the reissue of U.S. Pat. No. 7,962,549. The reissue applications include application Ser. Nos. 13/918,809 (the parent reissue) and concurrently-filed continuation reissues 15/688,592 (the present continuation reissue) 15/688,610, and 15/688,565, all of which are reissues of U.S. Pat. No. 7,962,549;*

*The present application is a continuation reissue of U.S. patent application Ser. No. 13/918,809 filed Jun. 14, 2013, which is an application for reissue of U.S. Pat. No. 7,962,549 filed Jul. 19, 2010 as U.S. patent application Ser. No. 12/839,311 and issued on Jun. 14, 2011; the '549 patent is a continuation of U.S. patent application Ser. No. 12/218,581 filed Jul. 15, 2008, which is a divisional of U.S. patent application Ser. No. 10/359,359 filed Feb. 4, 2003, which claims the priority benefit of U.S. provisional patent application number 60/376,115 filed on Apr. 26, 2002, the disclosures of which are incorporated by reference herein.*

BACKGROUND OF THE INVENTION

1. Field of the Invention

The present invention relates generally to computer networks and, more particularly, to creating an interactive gaming environment over a computer network.

2. Description of the Related Art

Computer networks, such as local area networks and the Internet, are increasingly being used as the backbone for various transactions and interactions between parties. From online banking, where bank customers can initiate financial transactions over a computer network, to online gaming, where garners can participate in real-time gaming over the Internet, service providers are increasingly supporting a variety of services over computer networks. There are currently a variety of different computer network configurations that facilitate the transactions and interactions that take place.

Many of the online applications involve multi-user applications, which are computer programs that are executed on a computer system and which allow multiple geographically separated participants to interact with the computer program and other participating users in an application environment. For example, gaming is a popular multi-user application that is increasing in popularity. An aircraft simulation game can enable multiple participants to pilot their respective virtual aircraft within an airspace, and can enable the participants to interact with other participants in their aircraft in the same airspace. Thus, the online gaming application provides a single application environment or universe in which multiple participants maneuver.

To support multi-user applications, such as online gaming, with geographically dispersed application users, such as game participants, and to support real-time interaction among the users in the application environment, it has been necessary to share information about every participant in the environment. For example, in an aircraft simulation application, it becomes necessary to share information about the airplanes for each of the participants, including aircraft size, speed, altitude in three-dimensional space, appearance details, virtual environment details (such as buildings and terrain), and the like. Such information permits the computer at each participant to properly keep track of game developments and determine the actions being performed by each of the participants. This permits each participant to obtain properly rendered visual images on the participant's viewing display.

The amount of information that must be shared among all of the participants can become daunting and can result in bandwidth difficulties. The amount of information that must be shared among participants is so great that it has inhibited the development of online gaming and other online multi-user applications. A technique for distributing the management of online applications is described in U.S. Pat. No. 5,841,980 to R. Waters et al. entitled Distributed System for Communication Networks in Multi-User Applications.

The '980 patent describes a system configuration in which the functionality of a monolithic server is distributed across multiple servers, each of which services a number of local users. Thus, whereas a single server previously served as the source of all application information, such as game state, the '980 patent describes a situation in which the game server functionality is distributed across multiple computers. Users (on-line participants) are free to login to their most convenient server. In this way, there is no single "choke point" that might inhibit game play, and the bandwidth requirements for the online game community are reduced. Even with the reduction in overall bandwidth demands, the sheer volume of data that must be transmitted between users to support the online environment can result in local pockets of strained bandwidth capacity.

Other multi-user applications provide a somewhat cumbersome user interface and can be inefficient for operation of the application server. For example, some online gaming portals provide links to game sites of interest. The server that provides the gaming portal Web site only provides links to game pages or game Web sites. Thus, the gaming portal will redirect a user to the appropriate game server or host for information about ongoing games. This places additional operational burdens on the game servers.

Unfortunately, current multi-user applications are not configured for maximum efficiency of operation and cannot support a number of application users to make online gaming a viable opportunity. Thus, there is a need for an improved, more efficient online multi-user application environment. The present invention satisfies this need.

SUMMARY OF THE INVENTION

The present invention provides for creating an interactive gaming environment. In various embodiments, methods of the present invention may include initializing an interactive game application at a game server which is then characterized as having an active status, notifying a lobby server concerning the active status of the game server, registering the application with a universe management server via the lobby server, and allowing users to join the interactive gaming environment. The users joining the interactive gaming environment may be identified by a server key obtained from the game server.

DETAILED DESCRIPTION

System Construction

Figure 1:
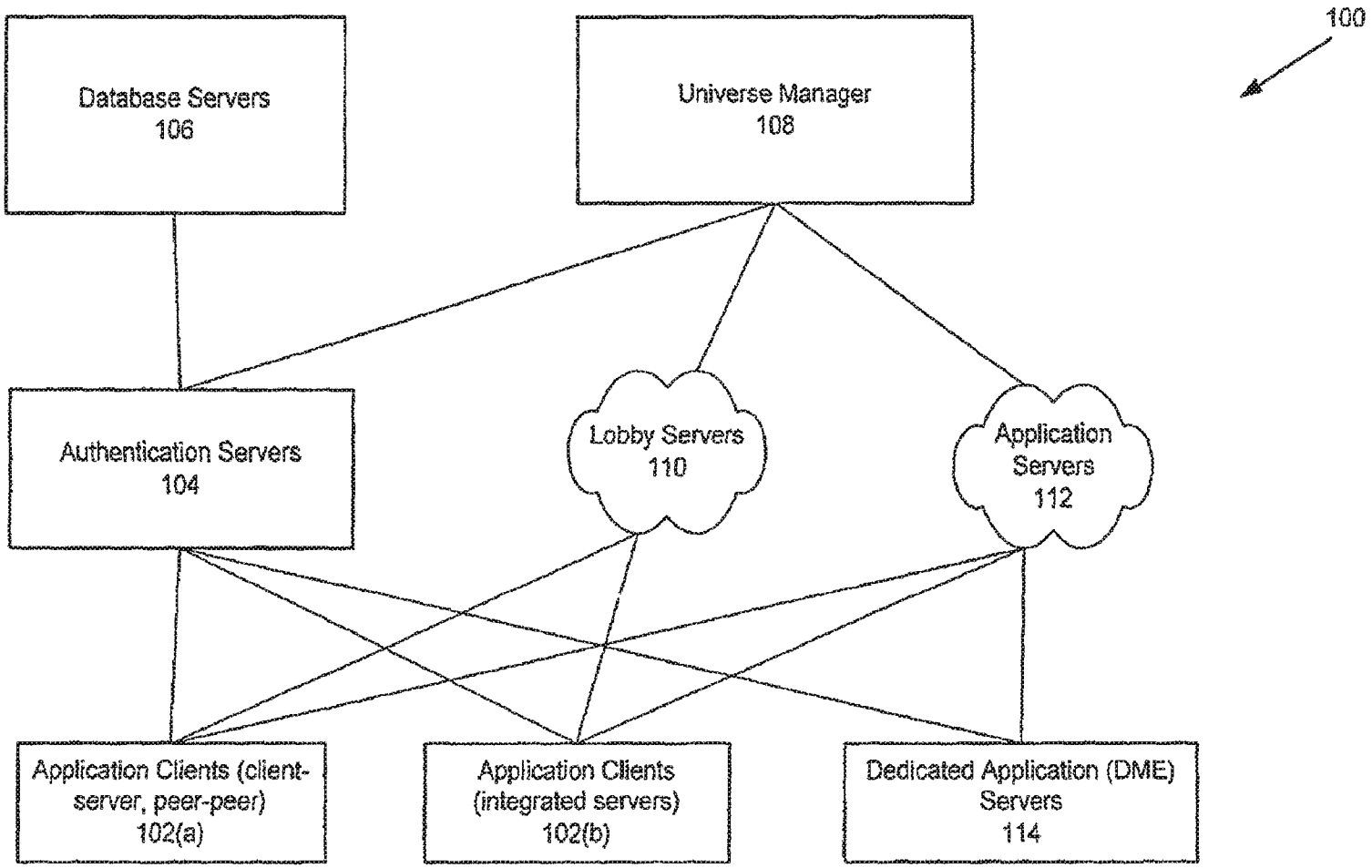
FIG. 1 is an illustration of a computer network system on which is run a multi-user application configured in accordance with the present invention.

FIG. 1 is a block diagram of a computer network system 100 comprised of one or more network devices including one or more client computers 102 who communicate with an authorization server 104 to gain access to the system, including participation with multi-user online applications. As described further below, the client computers can comprise computers 102(a) configured in a classic client-server configuration, or in a peer-to-peer configuration, or can comprise computers 102(b) configured in an integrated server configuration that combine the functionality of other computers with the client computer functions. References to client computers 102 will be understood to be a collective reference to either configuration, or references to one configuration subgroup 102(a), 102(b) or the other will be to the specific subgroup specified. An authentication server determines whether authorization is warranted by consulting a database server 106 for user records. The authentication server also communicates with a universe manager computer 108 that maintains records about online users and helps manage the online application environment, or universe.

After an authentication server 104 authorizes a user 102 to continue, the user can participate in an online multi-user application by first communicating with lobby servers 110 to obtain application-level information. The application-level information can include information about an application and its participating users. In the context of an online game application, for example, the lobby server 110 can provide information about the game and about currently participating users. After selection of an online multi-user application, the user is redirected to an appropriate application server 112, from which the user receives information sufficient to permit the user to join the online environment of the multi-user application. Thus, application level information is maintained at a lobby server 110, rather than at each individual application server or host machine 112. Users can therefore learn about and select a desired application, such as an aircraft online game, through communication with the lobby server, leaving the application servers free to host their particular applications.

In FIG. 1, the lobby servers 108 and application servers 112 are depicted as cloud shapes to indicate that the functionality of these servers can be distributed across multiple computers who collectively provide the functionality or can be provided by one or more independent network computers. For example, the application servers 112 can comprise dedicated application server computers 114 that function as a distributed memory engine (DME). As an alternative, as described further below, the application servers can comprise a combination of integrated servers 102(b) and application servers 112 acting in a proxy capacity to provide an interface to the universe manager 108. Similarly, the function of the lobby servers 110 can be provided by dedicated lobby servers that communicate directly with the clients 102, or the lobby server functions can be provided by other computers that communicate with the clients, such as the authentication server or universe manager 108.

Thus, the functionality of the game server is split between the lobby server and the application server. The lobby server can therefore reduce the bandwidth requirements and other operating demands on the application server. The application can comprise, for example, a multi-user interactive gaming application. This improves efficiency of operation.

In accordance with the invention, cross-user communications as well as cross-application communications in real-time are facilitated through the lobby server concept. A user who is participating with one application can communicate with a user who is participating with a different application. Thus, a first user can be logged in to lobby server and can be participating in an aircraft online game environment through an application server, while a second user can be logged in to the same lobby server, but can be participating with a different application in a different programming environment, such as a financial package or a different online game. The first user and the second user can communicate with each other, if they wish, or they can choose to participate in their respective environments, isolated from each other in terms of communications.

The universe manager 108 acts in an overall supervisory role, maintaining information about the users (clients) 102 who are registered with the system and logged on, communicating with the users via the authorization servers 104, lobby servers 110, and application servers 112. The lobby servers 110 provide application level information to the users, thereby acting as an application portal and source of application information to the clients 102. For example, unlike typical game portal servers that merely provide links to game sites, the lobby servers provide information about games in progress and can provide game-level information, such as information about the players who are actively participating in a game. The application servers 112 provide the actual application environment. For example, in the situation where the online application is a game, the application servers provide the actual game play environment comprising player participants, audio and graphics information, and other data necessary for a client 102 to fully participate in the online gaming experience for the game administered by the particular application server 112. In this way, many tasks that must be performed to support system operation can be performed according to the most appropriate machine to perform the task.

Figure 2:
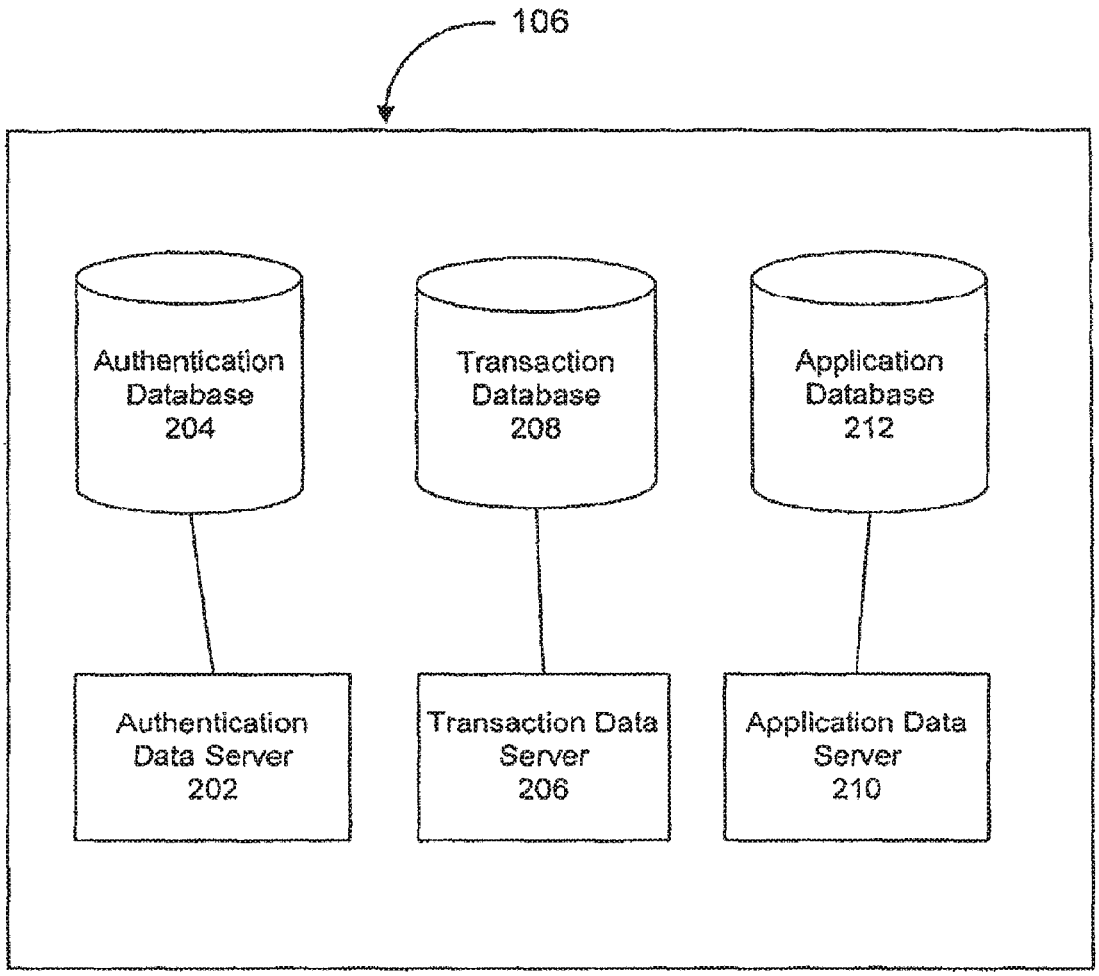
FIG. 2 is a detail block of the system shown in FIG. 1.

As noted above, the authentication servers 104 communicate with database servers 106 for authentication, application information, and the like. FIG. 2 illustrates details of the database servers and shows that the database servers can comprise multiple servers and associated database storage. For example, FIG. 2 shows a database server 106 that includes an authentication data server 202 and an associated authentication database 204, a transaction data server 206 and associated transaction database 208, and an application data server 210 and associated application database 212. The operation and configuration of these components will be better understood with reference to the following description.

System Operation

Figure 3:
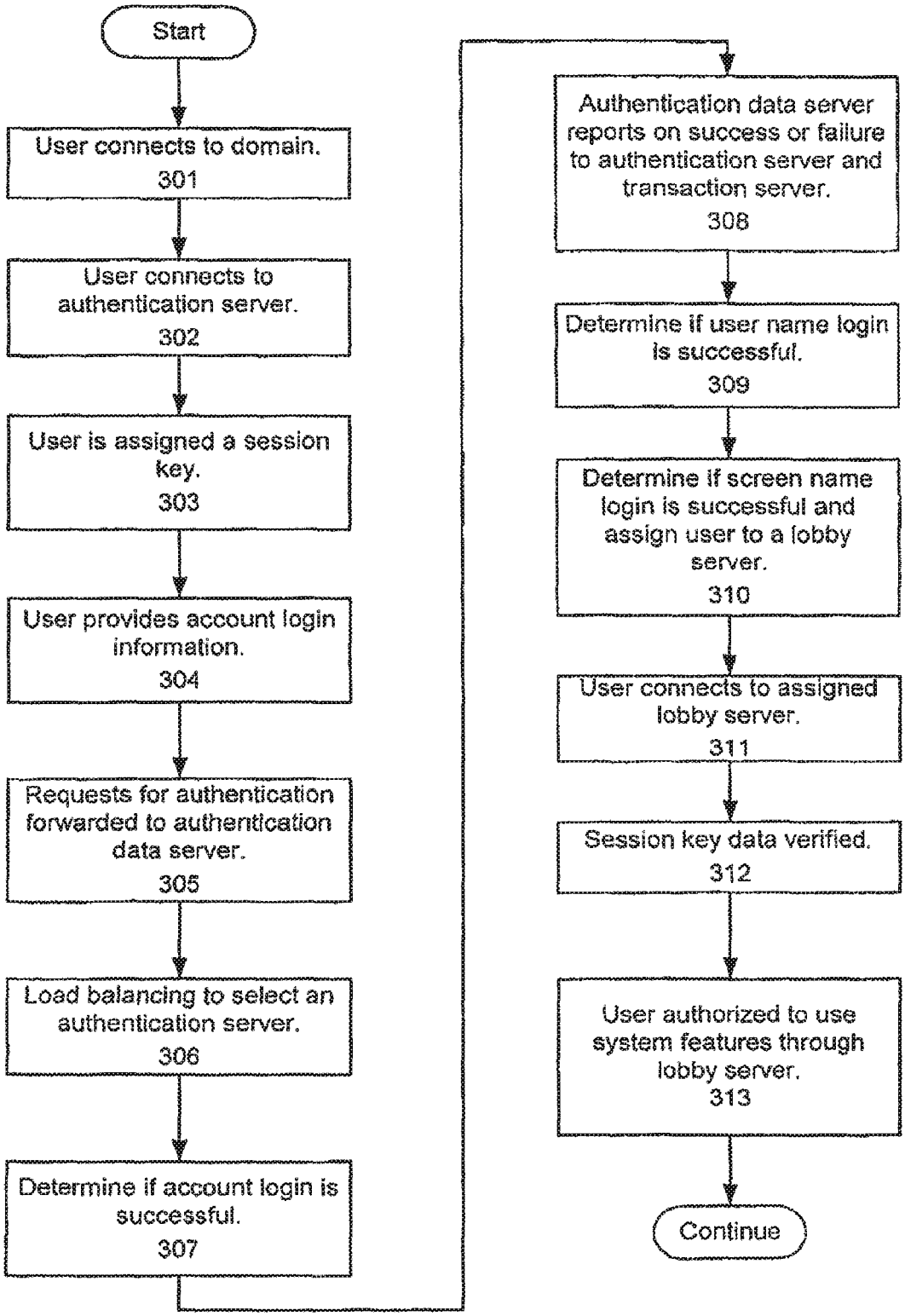
FIG. 3 is a flow diagram of the operations performed by the system of FIG. 1.
Figure 4:
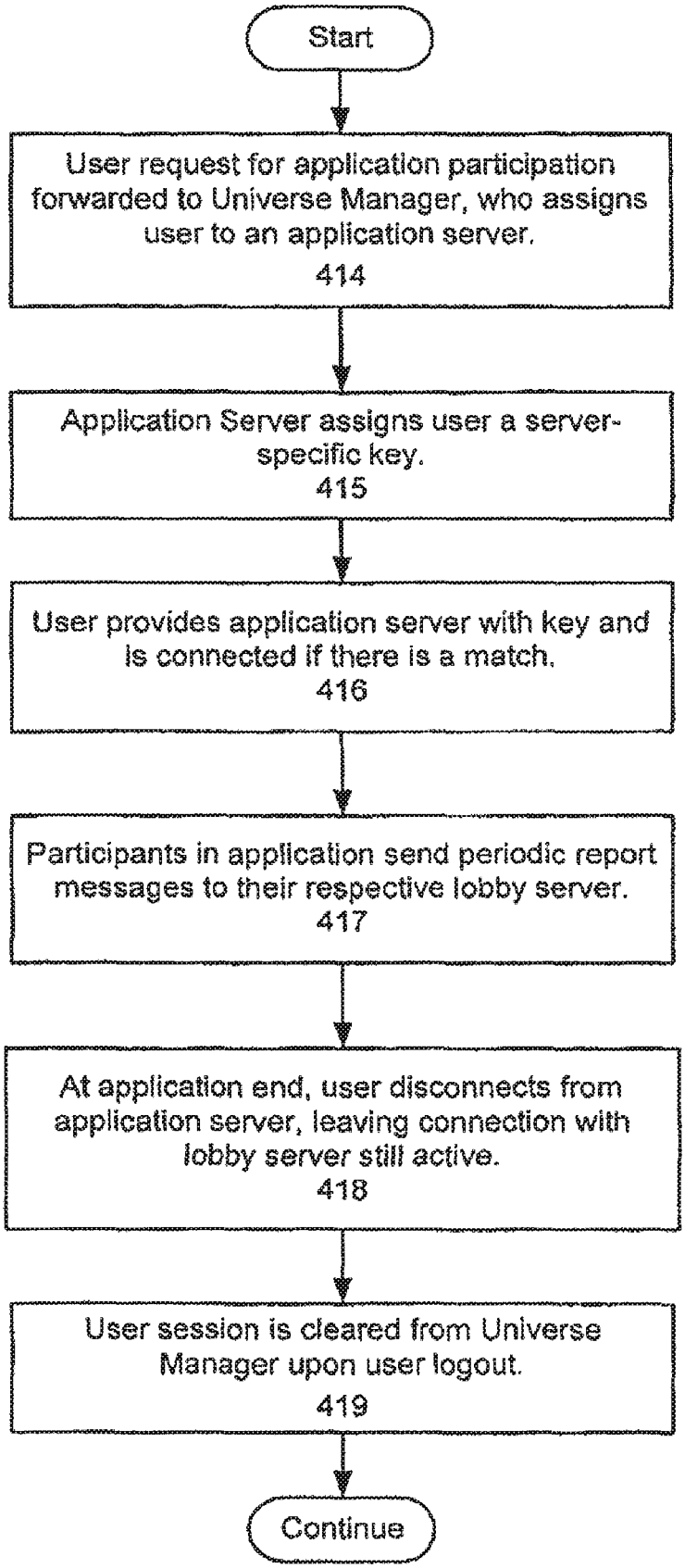
FIG. 4 is a flow diagram that shows further system operations in addition to those shown in FIG. 3.
Figure 5:
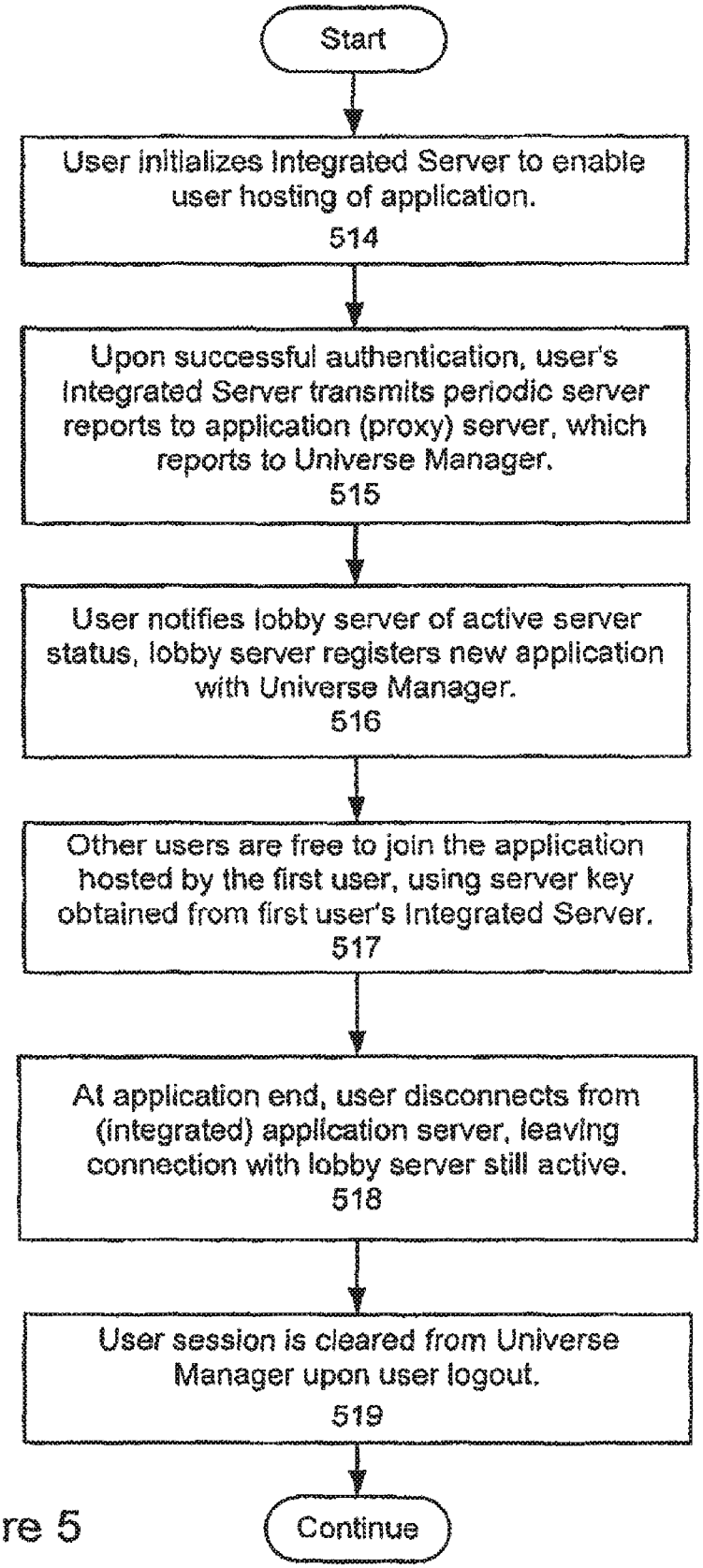
FIG. 5 is a flow diagram that shows further system operations in addition to those shown in FIG. 3.

FIGS. 3, 4, and 5 are flow diagrams that illustrate the functioning of the system constructed in accordance with the invention to provide improved operation of online multi-user applications.

In the first operation, represented by the flow diagram block 301, a user connects to a network domain name, such as a game portal or other Internet site to attempt access and login to a multi-user application, such as an online game. In the next operation, the user is redirected to one of the authentication servers. This operation (represented by block 302) can include operation through a load balancer or similar configuration for server workload management. At the next block 303, the user is assigned a session key by an authentication server. The session key will remain active during the current online session by the user and will be associated with a privilege level, thereby providing a means for the various system components (illustrated in FIG. 1) to determine the level of access to be granted to the user. The user then supplies account login information to the authentication server, at block 304, and then the authentication server forwards an authentication request to the authentication data server (of the database servers), as indicated at the block 305. The account login involves a user's registered account number or other identifier against which a user's right to access can be determined. At the next operation (block 306), the authentication request is processed with appropriate load balancing and is directed to a particular one of the authentication servers.

At the next block 307, the authentication data server communicates directly with the authentication database to determine whether the user's login should be accepted. This operation can involve, for example, checking the user's account history to ensure all appropriate fees have been paid and to ensure the user has all authorizations or qualifications to proceed. To maintain the user's history, this operation 307 also involves sending the transaction record (login attempt) to the transaction data server for non-volatile storage. This recording operation also can involve a load balancing operation.

The success or failure of the login attempt is reported back to the authentication server, at the next block 308. The login result is forwarded back to the user and also to the transaction data server. At the next block 309, similar processing operations are repeated for the user name login procedure. Yet another similar login sequence occurs for the user's screen name, along with an application identification, as indicated at the block 310. If the screen name login is successful, then the authentication server will assign the user to a lobby server and will also promote the session privilege level to the Universe Manager, so that the user will be granted all appropriate access during the session. It should be noted that the authentication server is aware of the lobby servers that are available corresponding to the application ID provided by the user, by requesting an appropriate application server from the Universe Manager. The Universe Manager keeps track of the available lobby servers via "heartbeat" reports that are sent by lobby servers to the Universe Manager continuously while the lobby servers are operational. This processing is represented by the next block 310.

Next, at the block 311, the user disconnects from the authentication server and establishes communication with the assigned lobby server. At the block 312, the user verifies the session key that was obtained from the authentication server at block 303 and also verifies the application ID with the assigned lobby server. The lobby server verifies the data, as well as the privilege level, with the Universe Manager. The user's privilege is upgraded upon successful verification.

In the next phase of system operation, at block 313, the user has successfully completed login with a lobby server and therefore is entitled to participate in system-wide functions. These functions can include, for example, chat, group or community management, player-matching activities such as team or clan tasks, and outcome or competitive standings and ladder progress. Any requests from the user for information regarding available chat channels, available games, location of other users, messaging functions, and the like, the request is forwarded from the lobby server to the Universe Manager. If a request for information involves the non-volatile storage, then the request is forwarded to the appropriate database server (FIG. 2).

One of the system-wide functions that a user might want to participate in following successful connection with a lobby server can comprise using an application. In the context of an online gaming environment, that application is a game. Those skilled in the art will appreciate that other online multi-user applications can be involved. As noted above, the clients can participate in online gaming as either part of a client-server configuration or peer-to-peer configuration, or as part of an integrated application server and client configuration. FIG. 4 relates to users who are operating in a client-server or peer-to-peer configuration, and FIG. 5 relates to users who are operating in an integrated application server configuration.

In FIG. 4, the first operation (which occurs upon the user wanting to join a game after completion of the last block in FIG. 3), is for the lobby server to forward the user's application (game) request to the Universe Manager. In the FIG. 4 processing, the client is configured as a classic client-server configuration or as a peer-to-peer configuration. The Universe Manager assigns the user to a game server that is appropriate for the requested game. The game servers keep the Universe Manager apprised of their status via continuous, periodic heartbeat reports, in a fashion similar to that of the lobby servers. In this way, the Universe Manager is aware of system status and can manage and respond to requests from the lobby servers and application servers. After the first processing operation shown in FIG. 4 (block 414), the assigned application server assigns a server specific key to the user (block 415). The key provides an extra measure of security to prevent unauthorized access. The authentication server asks either the Universe Manager or the assigned application server for the key, and forwards the key to the user through the Universe Manager and to the lobby server.

In the next block 416, the user is connected with the assigned application server, providing it with the server-specific key it received from block 415. The user will be disconnected from the application server if the server-specific key does not match the records at the application server. If there is a match, the user is allowed to remain connected with the application server. It should be noted that the user remains connected to a lobby server throughout use of the application, such as during a game playing session. At block 417, periodic user reports are sent from an application-participating user back to the user's lobby server. In addition, the application server who is hosting the application for all participants (such as the game host) sends periodic reports on the status of the application to the application host. The lobby server and application server do not directly communicate, thereby better managing the processing load on the lobby server.

At the conclusion of the application session (block 418), the user disconnects from the application server and returns to normal activities, including all available lobby functions through the lobby server. As noted, these functions can include chat, group or community management, messaging, and the like. It should be noted that these functions are available to the user at all times when the user is connected to the lobby server, including during application use (e.g., during game play).

If the user performs a logout procedure, or if the user is timed out from an active connection because of inactivity, the user's session is cleared from the active records of the Universe Manager. This is indicated at the next block, 419. If the user wishes to participate in another application, the user must go through the authentication process once again, including the login process.

Rather than operate in a network configuration in which applications are provided by dedicated application servers, the network can also operate in a configuration in which the multi-user application is provided by integrated servers. An integrated server refers to a user (client) machine that has been configured with an integrated server application that provides the user machine with application server functionality. A system that implements this method of operation is described in co-pending U.S. patent application Ser. No. 09/704,514 by C. Guy, G. Van Datta, and J. Fernandes entitled "Application Development Interface for Multi-User Applications Executable Over Communication Networks" filed Nov. 1, 2000. The disclosure of this application is hereby incorporated by reference. As noted above, when a user wants to join a game, the system operation moves from the description of FIG. 3 to the description of either FIG. 4 (dedicated application server) or FIG. 5 (integrated server).

Turning now to FIG. 5, the first operation under the integrated server configuration is for a user who wants to host an application (such as an online game) to initialize an integrated server application that has been installed on the user's computer. The integrated server application makes a connection to an appropriate domain name, such as a game portal Web site. The integrated server then executes an authentication process with an authentication server, in a process similar to the initial login process described in conjunction with FIG. 3. These operations are represented by the first block 514 of FIG. 5.

Upon successful authentication with the authentication server, the hosting user's integrated server application causes periodic server reports to be transmitted to a proxy application server. As noted above, the proxy application server is included within the application server cloud 112 of FIG. 1. The proxy application server can comprise an application in addition to or integrated with the integrated server application at the hosting user, or the proxy application server can comprise a separate server that is another node of the FIG. 1 network and that communicates with the hosting user's computer. In any case, the user's integrated server application provides periodic, regular "heartbeat" reports to the proxy application server to confirm the operation of the hosted application and to provide status information to the proxy application server. The proxy application server communicates with the Universe Manager, providing the Universe Manager with the application status information received from the hosting user machine. The Universe Manager includes these reports in its data collection, just as it would with similar reports from dedicated application servers and from any other integrated servers. These reporting operations are represented by the second block 515 of FIG. 5.

In the next operation, block 516, the user notifies its assigned lobby server of its status as an active application server. This new executing application will now be available over the network. The lobby server then registers this new application with the Universe Manager, which adds the appropriate application information to its data collection. This operation is performed by the Universe Manager in a manner similar to what it would perform in response to any other server becoming available with a network application.

After the new application has been registered with the Universe Manager, the network nodes will become aware of the application through respective lobby servers. Therefore, the application becomes available for network users, who can join the program environment established by the integrated server. For example, if the application is a multi-user game, then other network users can join the on-going game, as managed by the hosting user's integrated server. The process of joining a game in progress involves the same operations as described above in conjunction with blocks 414, 415, 416, and 417 of FIG. 4. These operations involve communicating with an appropriate application server, receiving a server-specific key, providing the server with that key, becoming authorized and providing regular "heartbeat" reports to the lobby server. These integrated server operations are represented by the "join" block 517 of FIG. 5.

At the conclusion of the application session (block 518), a participating user can disconnect from the integrated server and return to normal activities, including all available lobby functions through the lobby server. As noted, these functions can include chat, group or community management, messaging, and the like. As noted above, these functions are available to the user at all times when the user is connected to the lobby server, including during application use (e.g., during game play). If a hosting user (the integrated server) wishes to withdraw from hosting the application, the network system (FIG. 1) can implement procedures as desired to ensure an orderly shut down of the application or an orderly transition to a different integrated server that continues on with the program environment of the hosted application.

If the user performs a logout procedure, or if the user is timed out from an active connection because of inactivity, the user's session is cleared from the active records of the Universe Manager. This is indicated at the next block, 519. If the user wishes to participate in another application, the user must go through the authentication process once again, including the login process.

Ladder Ranking

The application program interface that is shared in common with all the components illustrated in FIG. 1 also includes provision for a ladder ranking engine. A ladder ranking is a list of users that is organized or sorted according to a predetermined variable or metric. The ladder ranking is most easily understood in the context of a gaming application, where the predetermined variable likely refers to wins, losses, points scored, and the like. As a user improves his or her performance, the user's ranking will improve, meaning that the user will move up a "ladder" of ranked users. Thus, the ladder ranking information can be used for various competitive purposes, such as contests and tournaments.

The ladder ranking information is collected via functionality in each multi-user application that periodically reports the application status to the corresponding application server. The status can include information such as progress of players in the game. The application servers then store the information to a system database that is indexed according to a user's account information and application currently being used. This information is managed by a ladder engine that can operate at any location of the network, for example, at the Universe Manager, and the data can be stored at data storage of the Universe Manager or in the database servers (FIG. 1).

The system interface preferably provides for any registered user to request a ladder ranking, which will be provided through the ladder ranking engine. The request can come from a user via an application with which the user is currently participating. This ensures that non-participants cannot falsely obtain the ladder ranking information. The ladder ranking requests can be received by a lobby server or application server from a user, and the request can be forwarded to the ladder ranking engine at the Universe Manager or whatever other network entity that manages the ladder rankings. When a ladder ranking list is requested, all of the user accounts for the specified application are sorted based on the stored user performance data. The application status information preferably includes multiple statistics, which can be stored simultaneously in the database. For example, a gaming application can track wins, losses, points scored, points allowed, and other performance statistics of interest. Each metric can be sorted on, thus generating a ladder ranking according to the metric chosen by the user who requests the ladder ranking. Moreover, the ladder ranking engine provides sorting and retrieving of a ladder ranking in ascending or descending order. For example, a ladder ranking can be provided in order from most points to least points, or from least points to most points.

The various servers and databases of the system have no knowledge about the nature of the statistics. That is, the servers do not examine the underlying data to understand the difference between wins and losses or points and goals. Rather, the various applications define the data set to be collected for that application, and the servers and databases simply store the collected data in the database. Thus, each application will define its own data collection format, which will be supported by the database servers.

The data can be included in a 256-byte data field that is assigned to each user's account for each application with which the system interfaces. For example, the application code can execute the ladder ranking function by specifying data parameters of sort order, start byte, end byte. Upon receiving a ladder ranking message with these parameters, a server or database of the system will retrieve all data fields for all accounts associated with the calling application. The data in each data record between the start byte location and the end byte location will be treated as an integer value. The sort operation will then be performed on the retrieved data, in ascending or descending order depending on the value of a user-supplied sort order parameter. The sorted integer numbers can then be displayed to a user in accordance with known headings for the integer data. For example, a particular application might store performance data as number of wins, followed by number of losses, followed by points scored, followed by points allowed. When the performance data is retrieved, the data can be parsed to extract the requested data for proper display. Other applications can store different performance parameters in a different order, which will be known to the corresponding application server. In this way, the ladder ranking engine provides a powerful generic, cross-application ladder rankings system.

Clans Engine

Another feature of the system described herein is a clans engine that allows a designated user of any trusted application, a user referred to as a "leader", to name and create a clan. The leader can then issue invitations to other users for joining the clan. The system will queue up any invitations sent to registered users who are not online at the time the invitation is sent, for delivery at the invitee's next login. A user who receives a clan invitation can respond affirmatively or negatively and, if desired, can become a member of the clan.

The system supports a variety of clan features. Members of a clan can send private electronic messages to the members of the clan. The clan messages can be stored on the servers of the system until delivery, which occurs as each member completes the next login process. The system permits clans to elect new leaders and set up various organizational structures for their clan. Examples of organizational structures include dictatorships, where one leader is in charge of all decisions of the clan, or a democracy, where all members and the leader have equal votes in the clan decision making. The leader who initiates the clan can select which of these, or other, configurations will be utilized.

All of the various clan data, including the clan membership list, clan activity tracking, clan electronic messaging, and the like are saved by database servers of the system. The clan functionality is accessed through the program interface in accordance with the present invention, in a manner similar to that described above for the ladder ranking data. This permits many discrete functions to be provided and specified or deleted for each clan, making the composition rules and operation of each clan potentially exclusive. Moreover, the program interface permits the clan functionality to be used in a generic way for multiple applications. For example, in a gaining context, the same team or clan functionality can be applied whether the application is a flight simulator, car racing game, or action-shooter game.

In addition, multiple applications can share the same clans and membership servers and databases at the same time, without interfering with each other. User accounts can be associated with more than one clan in the same application or in clans that extend across multiple applications, without any impact to the user account or to the clan functionality.

The clan engine in accordance with the present invention manages the clan data using server-side processing, rather than relying on offline, Web-based clan management techniques or client-side arbitration, with nothing built into the actual application itself. Thus, any application developed for the program interface described herein can utilize the clan processing that is built into the interface specification, servers, and databases of the FIG. 1 system.

Network Device Construction

Figure 6:
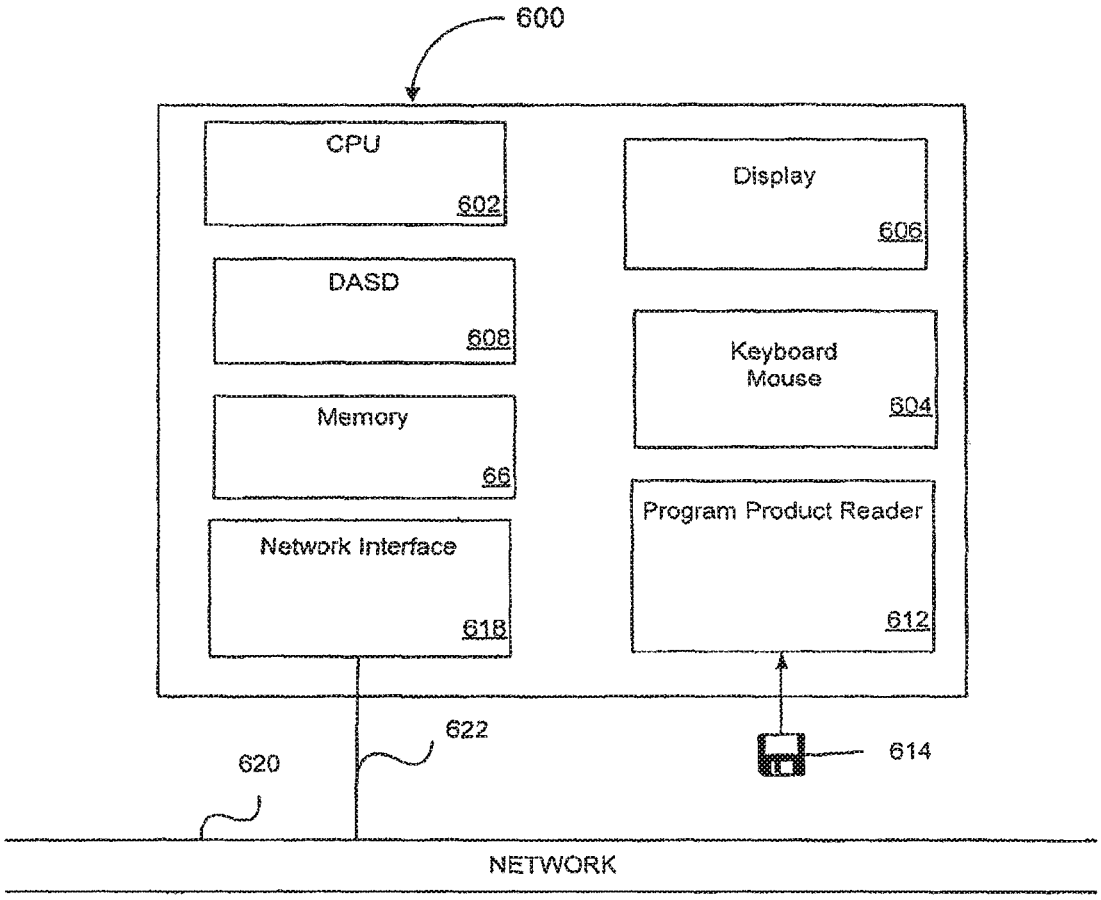
FIG. 6 is a block diagram of a computer in the network illustrated in FIG. 4, illustrating the hardware components.

The network computer devices (clients and servers) shown in the block diagram of FIG. 1 comprise nodes of a computer network system 100. FIG. 6 is a block diagram of a computer in the system 100 of FIG. 1, illustrating the hardware components included in one of the computers that provide the functionality of the servers and clients. Those skilled in the art will appreciate that the servers and clients illustrated in FIG. 1 can all have a similar computer construction, or can have alternative constructions consistent with the capabilities and respective functions described herein.

FIG. 6 shows an exemplary computer 600 such as might comprise any of the network computers. Each computer 600 operates under control of a central processor unit (CPU) 602, such as a "Pentium" microprocessor and associated integrated circuit chips, available from Intel Corporation of Santa Clara, Calif., USA. A computer user can input commands and data from a keyboard and computer mouse 604, and can view inputs and computer output at a display 606. The display is typically a video monitor or flat panel display. The computer 600 also includes a direct access storage device (DASD) 608, such as a hard disk drive. The memory 610 typically comprises volatile semiconductor random access memory (RAM). Each computer preferably includes a program product reader 612 that accepts a program product storage device 614, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 600 can communicate with the others over a computer network 620 (such as the Internet or an intranet) through a network interface 618 that enables communication over a connection 622 between the network 620 and the computer. The network interface 618 typically comprises, for example, a Network Interface Card (NIC) or a modem that permits communications over a variety of networks.

The CPU 602 operates under control of programming steps that are temporarily stored in the memory 610 of the computer 600. When the programming steps are executed, the computer performs its functions. Thus, the programming steps implement the functionality of the respective client or server. The programming steps can be received from the DASD 608, through the program product storage device 614, or through the network connection 622. The program product storage drive 612 can receive a program product 614, read programming steps recorded thereon, and transfer the programming steps into the memory 610 for execution by the CPU 602. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 610 over the network 620. In the network method, the computer receives data including program steps into the memory 610 through the network interface 618 after network communication has been established over the network connection 622 by well-known methods that will be understood by those skilled in the art without further explanation. The program steps are then executed by the CPU 602 thereby comprising a computer process.

It should be understood that all of the network computers of the network system 100 illustrated in FIG. 1 can have a construction similar to that shown in FIG. 6, so that details described with respect to the FIG. 6 computer 600 will be understood to apply to all computers of the system 100. It should be appreciated that any of the network computers can have an alternative construction, so long as the computer can communicate with the other computers illustrated in FIG. 4 and can support the functionality described herein.

Figure 7:
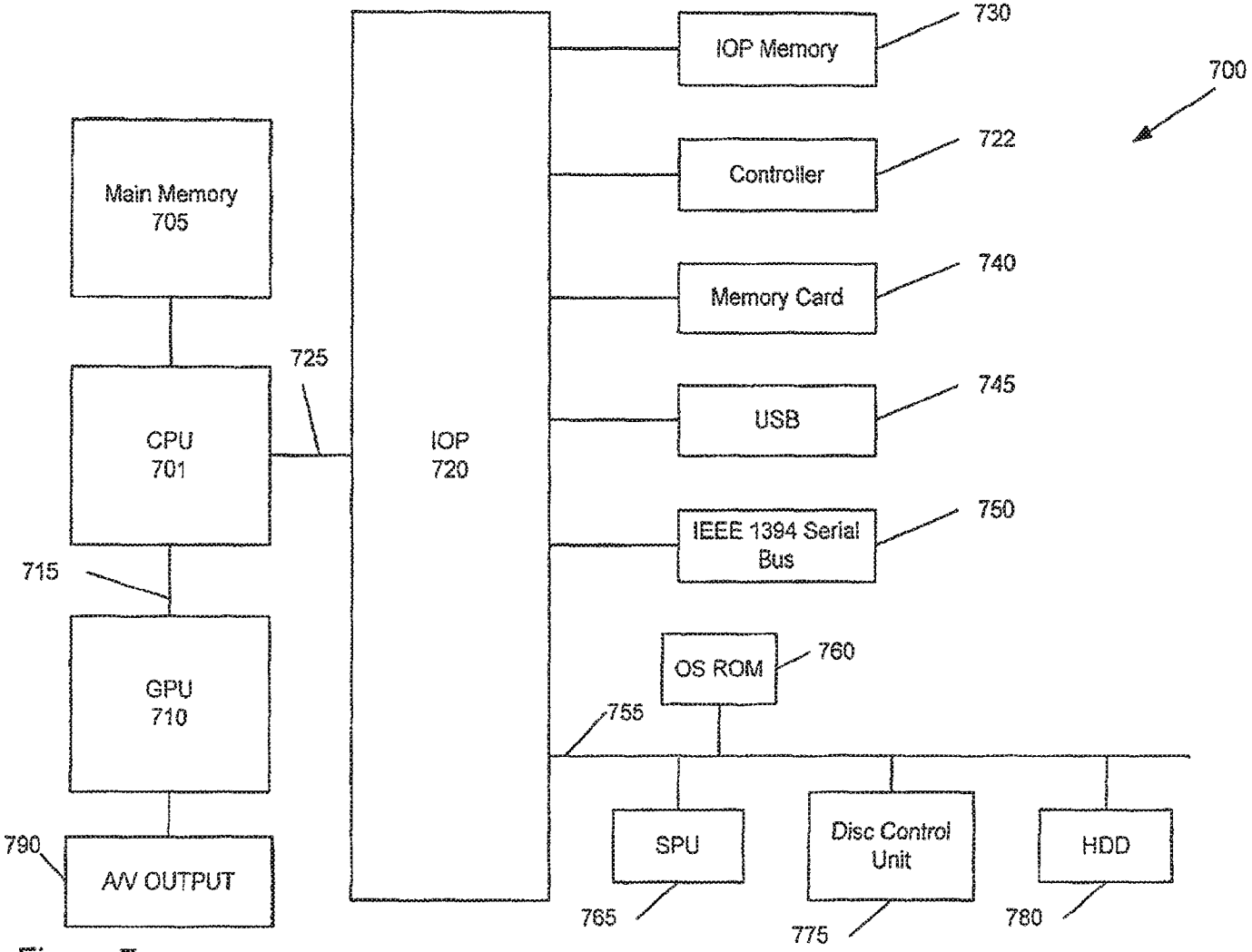
FIG. 7 is a block diagram of a computer entertainment system in the network illustrated in FIG. 1, illustrating the hardware components.

For example, with reference to FIG. 7, the client computers 102 can comprise a computer entertainment system, such as a video game console system 700. FIG. 7 is a block diagram of an exemplary hardware configuration of the video game console system 700.

The video game console system 700 includes a central processing unit (CPU) 701 that is associated with a main memory 705. The CPU 701 operates under control of programming steps that are stored in the OS-ROM 760 or transferred from a game program storage medium to the main memory 705. The CPU 701 is configured to process information and execute instructions in accordance with the programming steps.

The CPU 701 is communicatively coupled to an input/output processor (IOP) 720 via a dedicated bus 725. The IOP 720 couples the CPU 701 to an OS ROM 760 comprised of a non-volatile memory that stores program instructions, such as an operating system. The instructions are preferably transferred to the CPU via the IOP 720 at start-up of the main unit 700.

The CPU 701 is communicatively coupled to a graphics processing unit (GPU) 710 via a dedicated bus 715. The GPU 710 is a drawing processor that is configured to perform drawing processes and formulate images in accordance with instructions received from the CPU 701. For example, the GPU 710 can render a graphics image based on display lists that are generated by and received from the CPU 701. The GPU can include a buffer for storing graphics data. The GPU 710 outputs images to an AV output device 790 that is connected to the console system 700.

The IOP 720 controls the exchange of data among the CPU 700 and a plurality of peripheral components in accordance with instructions that are stored in an IOP memory 730. The peripheral components can include one or more input controllers 722, a memory card 740, a USB 745, and an IEEE 1394 serial bus 750. Additionally, a bus 755 is communicatively coupled to the IOP 720. The bus 755 is linked to several additional components, including the OS ROM 760, a sound processor unit (SPU) 765, an optical disc control unit 775, and a hard disk drive (HDD) 780.

The SPU 765 is configured to generate sounds, such as music, sound effects, and voices, in accordance with commands received from the CPU 701 and the IOP 720. The SPU 765 can include a sound buffer in which waveform data is stored. The SPU 765 generates sound signals and transmits the signals to speakers.

The disc control unit 775 is configured to control a program reader, which can comprise, for example, an optical disk drive that accepts removable storage media such as a magnetic floppy disk, an optical CD-ROM disc, a CD-R disc, a CD-RW disc, a DVD disk, or the like.

The memory card 740 can comprise a storage medium to which the CPU 701 can write and store data. Preferably, the memory card 740 can be inserted and removed from the IOP 720. A user can store or save data using the memory card 740. In addition, the video game system 700 is preferably provided with at least one hard disk drive (HDD) 780 to which data can be written and stored.

A data I/O interface, such as an IEEE 1394 serial bus 750 or a universal serial bus (USB) 745 interface, is preferably communicatively coupled to the IOP 720 in order to allow data to be transferred into and out of the video game system 700, such as to the network illustrated in FIG. 1.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiment described herein, but rather, it should be understood that the present invention has wide applicability with respect to multi-user applications generally. All modifications, variations, or equivalent arrangements and implementations that are within the scope of the attached claims should therefore be considered within the scope of the invention.

What is claimed is:

[1. A method for ladder ranking in a game application, comprising:

receiving a request for a ladder ranking list from a player having a user account registered with the game application, wherein the game application is associated with a plurality of registered user accounts and the request for the ladder ranking list includes one or more game performance metrics identified by the player;

executing instructions stored in memory, wherein execution of the instructions by a processor:

retrieves game performance data from all user accounts registered with the game application, the game performance data stored at an application server;

sorts all user accounts registered with the game application based on the stored game performance data; and generates a ladder ranking list including all sorted registered user accounts based on the one or more game performance metrics.]

[2. The method of claim 1, wherein the game performance data stored at the application server is collected during periodic game application status reports.]

[3. The method of claim 1, wherein the game performance metric includes the number of wins.]

[4. The method of claim 1, wherein the game performance metric includes the number of losses.]

[5. The method of claim 1, wherein the game performance metric includes points scored.]

[6. The method of claim 1, wherein the game performance metric includes points allowed.]

[7. The method of claim 1, wherein the ladder ranking list is sorted in ascending order.]

[8. The method of claim 1, wherein the ladder ranking list is sorted in descending order.]

[9. A system for ladder ranking in a game application, comprising:

a lobby server for receiving a request for a ladder ranking list from a player having a user account registered with the game application, wherein the game application is associated with a plurality of registered user accounts and the request for the ladder ranking list includes one or more game performance metrics identified by the player; and a ladder engine stored in memory and executable by a processor to:

retrieve game performance data from all user accounts registered with the game application, the game performance data stored at an application server, sort all user accounts registered with the game application based on the stored game performance data, and generate a ladder ranking list including all sorted registered user accounts based on the one or more game performance metrics.]

[10. The system of claim 9, wherein the ladder engine executes further instructions to sort the ladder ranking list in ascending order.]

[11. The system of claim 9, wherein the ladder engine executes further instructions to sort the ladder ranking list in descending order.]

[12. A non-transitory computer readable storage medium having embodied thereon a program, the program being executable by a processor to perform a method for ladder ranking in a game application, the method comprising:

receiving a request for a ladder ranking list from a player having a user account registered with the game application, wherein the game application is associated with a plurality of registered user accounts and the request for the ladder ranking list includes one or more game performance metrics identified by the player;

retrieves game performance data from all user accounts registered with the game application;

sorts all user accounts registered with the game application based on the stored game performance data; and generates a ladder ranking list including all sorted registered user accounts based on the one or more game performance metrics.]

*13. A lobby server apparatus for cross-application and real-time communication channels, the apparatus comprising:*

*a network interface that receives login information from a first client device; and*

*a processor that executes instructions stored in a memory, wherein execution of the instructions by the processor:*

*authenticates the login information received from the first client device,*

*establishes an online session with the first client device in accordance with a lobby server assignment based on the authenticated login information,*

*assigns the first client device to a game server in accordance with a game server assignment, wherein the first client device connects to the assigned game server based on the game server assignment and obtains game-related information from the assigned game server, and*

*performs a plurality of lobby server functionalities associated with the game-related information in accordance with a split distribution of functionalities that reduces one or more operating demands on the assigned game server, the lobby server functionalities including:*

*providing status information regarding game play of a first game by the first client device in a game environment provided by the assigned game server, the status information provided to at least a second client device;*

*establishing a channel for cross-application user communications in real-time between the first client device and the second client device during the game play of the first game by the first client device in the game environment provided by the assigned game server and during game play of a second game by the second client device, and*

*updating the status information regarding the first client device when the online session of the first client device is terminated.*

*14. The apparatus of claim 13, wherein the status information is provided via an application portal that provides real-time information regarding one or more games currently in progress and regarding players currently playing each game.*

*15. The apparatus of claim 13, wherein the login information includes information regarding an account registered to the first client device.*

*16. The apparatus of claim 13, wherein the processor executes further instructions to create a clan based on a request from the first client device, wherein the clan comprises the first client device and one or more other client devices.*

*17. The apparatus of claim 16, wherein the network interface sends an invitation to each of the other client devices, and wherein the processor executes further instructions to add the respective client device upon acceptance of the invitation.*

*18. The apparatus of claim 17, wherein at least one of the other client devices is not online when the respective invitation is sent, and wherein the invitation is made available to the at least one other client device when the at least one other client device next logs in.*

*19. The apparatus of claim 16, wherein the first client device further specifies that the other client devices are able to make decisions regarding the clan.*

*20. The apparatus of claim 16, wherein the channel for cross-application user communications is specific to the clan.*

*21. The apparatus of claim 16, wherein information regarding the created clan is used in a plurality of different game applications.*

*22. The apparatus of claim 16, further comprising memory that stores information related to the clan, the stored information including at least one of a member list, tracked activity, and electronic messages.*

*23. The apparatus of claim 16, wherein the clan includes an organizational structure that includes at least one client device identified as a leader, wherein the leader makes one or more decisions for the clan.*

*24. The apparatus of claim 13, wherein the network interface further receives periodic status reports sent from an application server of the first client device.*

*25. The apparatus of claim 13, further comprising memory that maintains information regarding a plurality of client devices that are currently logged in.*

*26. The apparatus of claim 13, wherein the online session of the first client device is terminated when the first client device performs a logout procedure or when the first client device is detected as having been inactive for a predetermined period of time.*

*27. The apparatus of claim 13, wherein the processor executes further instructions to perform player-matching.*

*28. The apparatus of claim 13, wherein the processor executes further instructions to provide information to the first client device regarding available chat channels, available games, or locations of other users.*

*29. The apparatus of claim 13, wherein the processor executes further instructions to provide a list of a plurality of client devices, wherein the list is ranked according to a predetermined metric.*

*30. A lobby server method for cross-application and real-time communication, the method comprising:*

*receiving login information sent over a communication network from a first client device; and*

*executing instructions stored in memory, wherein execution of the instructions by a processor:*

*authenticates the login information received from the first client device,*

*establishes an online session with the first client device in accordance with a lobby server assignment based on the authenticated login information,*

*assigns the first client device to a game server in accordance with a game server assignment, wherein the first client device connects to the assigned game server based on the game server assignment and obtains game-related information from the assigned game server, and*

*performs a plurality of lobby server functionalities associated with the game-related information in accordance with a split distribution of functionalities reduces one or more operating demands on the assigned game server, the lobby server functionalities including:*

*providing status information obtained from the assigned game server regarding game play of a first game by the first client device in a game environment provided by the assigned game server, the status information provided to at least a second client device,*

*establishing a channel for cross-application user communications in real-time between the first client device and the second client device during the game play of the first game by the first client device in the game environment provided by the assigned game server and during game play of a second game by the second client device, and*

*updating the status information regarding the first client device when the online session of the first client device is terminated.*

*31. The method of claim 30, wherein the status information is provided via an application portal that provides real-time information regarding one or more games currently in progress and regarding players currently playing each game.*

*32. The method of claim 30, wherein the login information includes information regarding an account registered to the first client device.*

*33. The method of claim 30, wherein execution of further instructions by the processor creates a clan based on a request from the first client device, wherein the clan comprises the first client device and one or more other client devices.*

*34. The method of claim 33, further comprising sending an invitation to each of the other client devices, and wherein execution of further instructions by the processor adds the respective client device upon acceptance of the invitation.*

*35. The method of claim 34, wherein at least one of the other client devices is not online when the respective invitation is sent, and wherein the invitation is made available to the at least one other client device when the at least one other client device next logs in.*

*36. The method of claim 33, wherein the first client device further specifies that the other client devices are able to make decisions regarding the clan.*

*37. The method of claim 33, wherein the channel for cross-application user communications is specific to the clan.*

*38. The method of claim 33, wherein information regarding the created clan is used in a plurality of different game applications.*

*39. The method of claim 33, further comprising storing information in memory related to the clan, the stored information including at least one of a member list, tracked activity, and electronic messages.*

*40. The method of claim 33, wherein the clan includes an organizational structure that includes at least one client device identified as a leader, wherein the leader makes one or more decisions for the clan.*

*41. The method of claim 30, further comprising receiving periodic status reports sent from an application server of the first client device.*

*42. The method of claim 30, further comprising maintaining information in memory regarding a plurality of client devices that are currently logged in.*

*43. The method of claim 30, wherein the online session of the first client device is terminated when the first client device performs a logout procedure or when the first client device is detected as having been inactive for a predetermined period of time.*

*44. The method of claim 30, wherein further execution of instructions by the processor performs player-matching.*

*45. The method of claim 30, wherein further execution of instructions by the processor provides information to the first client device regarding available chat channels, available games or locations of other users.*

*46. The method of claim 30, wherein further execution of instructions by the processor provides a list of a plurality of client devices, wherein the list is ranked according to a predetermined metric.*

*47. A non-transitory computer-readable storage medium, having embodied thereon a program executable by a processor to perform a lobby server method for cross-application channels in real-time communication, the method comprising:*

*receiving login information sent over a communication network from a first client device;*

*authenticating the login information received from the first client device;*

*establishing an online session with the first client device in accordance with a lobby server assignment based on the authenticated login information;*

*assigning the first client device to a game server in accordance with a game server assignment, wherein the first client device connects to the assigned game server based on the game server assignment and obtains game-related information from the assigned game server within the online session; and*

*performing a plurality of lobby server functionalities associated with the game-related information in accordance with a split distribution of functionalities reduces one or more operating demands on the assigned game server, the lobby server functionalities including:*

*providing status information obtained from the assigned game server regarding game play of a first game by the first client device in a game environment provided by the assigned game server, the status information provided to at least a second client device;*

*establishing a channel for cross-application communications in real-time between the first client device and the second client device during the game play of the first game by the first client device in the game environment provided by the assigned game server and during game play of a second game by the second client device; and*

*updating the status information regarding the first client device when the online session of the first client device is terminated.*

*48. The apparatus of claim 13, wherein establishing the online session with the first client device in accordance with the lobby server assignment includes associating the online session with a privilege level of authorized access based on the authenticated login information.*

*49. The apparatus of claim 13, wherein the authorized access includes one or more game applications, and wherein the game server assignment is based on a game application requested by the first client device.*

*50. The apparatus of claim 13, wherein the online session is established further based on a session key, and wherein the connection between the first client device and the assigned game server is further based on a server-specific key.*

*51. The method of claim 30, wherein establishing the online session with the first client device in accordance with the lobby server assignment includes associating the online session with a privilege level of authorized access based on the authenticated login information.*

*52. The method of claim 30, wherein the authorized access includes one or more game applications, and wherein the game server assignment is based on a game application requested by the first client device.*

*53. The method of claim 30, wherein the online session is established further based on a session key, and wherein the connection between the first client device and the assigned game server is further based on a server-specific key.*

* * * * *